United States Patent [19]

Keskey et al.

[11] Patent Number: 4,474,923

[45] Date of Patent: Oct. 2, 1984

[54] SELF-CURABLE LATEX COMPOSITIONS

[75] Inventors: William H. Keskey; James E. Schuetz; Do I. Lee; James E. Schwartz, all of Midland, Mich.

[73] Assignee: The Dow Chemical Company, Midland, Mich.

[21] Appl. No.: 504,119

[22] Filed: Jun. 14, 1983

[51] Int. Cl.³ .......................... C08F 2/16; C08K 3/20; C08L 9/04
[52] U.S. Cl. .................................... 524/458; 524/808
[58] Field of Search .............................. 524/458, 808

[56] References Cited

U.S. PATENT DOCUMENTS 4,325,856 4/1982 Ishikawa et al. .................... 524/458

Primary Examiner—Joseph L. Schofer
Assistant Examiner—J. M. Reddick

[57] ABSTRACT

Self-curable latex compositions contain particles of an oxazoline-modified polymer and particles of a coreactive polymer. These latex compositions are curable, yielding films and other articles having good tensile and elongation properties and excellent resistance to water and aqueous fluids. In addition, these latex compositions are self-curing at room temperature.

9 Claims, No Drawings

SELF-CURABLE LATEX COMPOSITIONS

BACKGROUND OF THE INVENTION

This invention relates to self-curing polymer latexes.

Diverse self-curing polymer latexes are known in the art. For example, blends of a carboxylated latex such as an acrylic acid/styrene/butadiene terpolymer latex with a melamine formaldehyde or urea formaldehyde resin are known to be self-curing, i.e., they form a curable composition which cures at elevated temperatures.

Other self-curable latex systems employ a carboxylated latex which is crosslinked with a polyvalent cation or with a cationic polymer. Such latexes have the disadvantages of being pH dependent and of forming films which are highly sensitive to water, solvents or other chemicals.

Consequently, a self-curable latex which is free of the disadvantages of previously known self-curable latexes would be highly desirable.

SUMMARY OF THE INVENTION

This invention is such a self-curable latex. The latex of this invention is a curable composition comprising an aqueous dispersion of (a) discrete particles of an oxazoline modified addition polymer which polymer has been prepared in an emulsion polymerization process from (1) an oxazoline as represented by the formula:

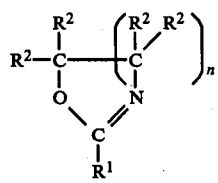

wherein $R^1$ is an acyclic organic radical having addition polymerizable unsaturation; each $R^2$ is independently hydrogen, halogen or an inertly substituted organic radical and n is 1 or 2 and (2) at least one other addition polymerizable monomer which is copolymerizable with the oxazoline and (b) discrete particles of a coreactive polymer which coreactive polymer has been prepared in an emulsion polymerization process from (1) an addition polymerizable coreactive monomer containing pendant groups which are capable of reacting with an oxazoline group to form covalent bonds thereto and (2) at least one other monomer which is copolymerizable with said coreactive monomer.

Surprisingly, the latexes of this invention, when dried to form films, coatings, or other articles, exhibit excellent tensile and elongation properties and are surprisingly resistant to aqueous and organic fluids. Also surprising is that many of the latexes of this invention are self-curable at room temperature, i.e., crosslinking of the latex occurs without heating the latex and without the addition of curing agents.

DETAILED DESCRIPTION OF THE INVENTION

The composition of this invention contains discrete particles of an oxazoline modified polymer. Said oxazoline modified polymer has been prepared by the emulsion polymerization of certain addition polymerizable oxazolines and at least one other copolymerizable monomer.

The oxazolines employed herein are as represented by the general structure:

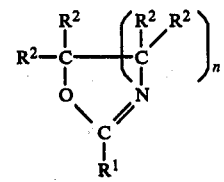

wherein $R^1$ is an acyclic organic radical having addition polymerizable unsaturation; each $R^2$ is independently hydrogen, halogen or an organic radical and n is 1 or 2. Preferably, $R^1$ is

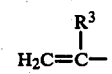

wherein $R^3$ is hydrogen or an alkyl radical. Most preferably, $R^1$ is an isopropenyl group. Each $R^2$ is preferably hydrogen or an alkyl group with hydrogen being most preferred; n is preferably 1. Most preferably the oxazoline is 2-isopropenyl-2-oxazoline.

The oxazoline modified polymer also contains repeating units derived from at least one monomer which is not an oxazoline and which is copolymerizable with the aforementioned oxazoline. A broad range of addition polymerizable monomers are copolymerizable with said oxazoline and are suitable herein. Suitable monomers include, for example, the monovinyl aromatics, alkenes, esters of α,β-ethylenically unsaturated carboxylic acid; carboxylic acid esters wherein the ester group contains addition polymerizable unsaturation; halogenated alkenes; acyclic aliphatic conjugated dienes and the like. Small amounts of crosslinking monomers such as divinylbenzene may also be employed.

The term "monovinyl aromatic monomer" is intended to include those monomers wherein a radical of the formula:

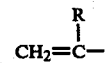

(wherein R is hydrogen or a lower alkyl such as an alkyl having from 1 to 4 carbon atoms) is attached directly to an aromatic nucleus containing from 6 to 10 carbon atoms, including those wherein the aromatic nucleus is substituted with alkyl or halogen substituents. Typical of these monomers are styrene, α-methylstyrene, ortho-, meta- and para-methylstyrene; ortho-, meta-and para-ethylstyrene; o,p-dimethylstyrene; o,p-diethylstyrene; isopropylstyrene; o-methyl-p-isopropylstyrene; t-butyl styrene; p-chlorostyrene; p-bromostyrene; o,p-dichlorostyrene; o,p-dibromostyrene; vinylnaphthalene; diverse vinyl (alkylnaphthalenes) and vinyl (halonaphthalenes) and comonomeric mixtures thereof. Because of considerations such as cost, availability, ease of use, etc., styrene and vinyltoluene are preferred and styrene is especially preferred as the monovinyl aromatic monomer.

Alkenes suitably employed herein include the monounsaturated aliphatic organic compounds such as ethylene, N- and isopropylene, the diverse butenes, pentenes, hexanes and the like as well as alkenes containing diverse substituent groups which are inert to the polymerization thereof. Preferred are unsubstituted $C_2-C_8$ alkenes with $C_2-C_4$ unsaturated alkenes being most preferred.

Esters of $\alpha,\beta$-ethylenically unsaturated carboxylic acids useful herein include typically soft acrylates (i.e., those whose homopolymers have a glass transition temperature ($T_g$) of less than about 25° C.) such as benzyl acrylate, butyl acrylate, sec-butyl acrylate, cyclohexyl acrylate, dodecyl acrylate, ethyl acrylate, 2-ethylbutyl acrylate, 2-ethylhexyl acrylate, heptyl acrylate, hexyl acrylate, isobutyl acrylate, isopropyl acrylate, methyl acrylate, propyl acrylate, etc.; hard acrylates (i.e., those whose homopolymers have a $T_g$ of greater than about 25° C.) such as 4-biphenylyl acrylate and tert-butyl acrylate; soft methacrylates such as butyl methacrylate, and hexyl methacrylate; and hard methacrylates such as sec-butyl methacrylate, tert-butyl methacrylate, cyclohexyl methacrylate, ethyl methacrylate, isobutyl methacrylate, isopropyl methacrylate, methyl methacrylate, propyl methacrylate, etc. The cost, availability and known properties of butyl acrylate and ethyl acrylate make these monomers preferred among the acrylates. The cost, availability and known properties of methyl methacrylate make it preferred among the methacrylates.

Halogenated alkenes useful herein include, for example, vinyl chloride, vinylidene chloride, vinyl fluoride, vinylidene fluoride, the diverse polychloro-, polyfluoro- and polybromo-alkenes and the like.

Acyclic aliphatic conjugated dienes usefully employed herein include typically those compounds which have from about 4 to about 9 carbon atoms, for example, 1,3-butadiene, 2-methyl-1,3-butadiene; 2,3-dimethyl-1,3-butadiene; pentadiene; 2-neopentyl-1,3-butadiene and other hydrocarbon analogs of 2,3-butadienes, such as 2-chloro-1,3-butadiene; 2-cyano-1,3-butadiene, the substituted straight chain conjugated pentadienes, the straight chain and branched chain conjugated hexadienes, other straight and branched chain conjugated dienes having from 4 to about 9 carbon atoms, and comonomeric mixtures thereof. The 1,3-butadiene hydrocarbon monomers such as those mentioned hereinbefore provide interpolymers having particularly desirable properties and are therefore preferred. The cost, ready availability and the excellent properties of interpolymers produced therefrom makes 1,3-butadiene the most preferred acyclic aliphatic conjugated diene.

Mixtures of two or more of the foregoing monomers may, of course, be employed herein, if desired. Of the foregoing monomers, most preferred are styrene, mixtures of styrene and butadiene, butyl acrylate, methyl methacrylate and vinyl acetate.

The proportion of monomers used in the oxazoline modified latex may vary considerably depending on the particular end use of the composition. Typically, however, the oxazoline is employed in relatively minor amounts, e.g. from about 0.1 to about 20, preferably from about 1 to about 10, weight percent of the monomers. In general, the oxazoline monomer is employed primarily to impart the desired self-curing characteristics to latex composition and the other monomers are employed to impart the other desired properties to the composition. For example, in a preferred oxazoline modified styrene/butadiene latex, the oxazoline modified polymer will advantageously exhibit physical properties (e.g., glass transition temperature, hardness, etc.) similar to those commonly associated with styrene/butadiene polymers. However, certain properties of the polymer, especially adhesion and crosslinking, will generally be enhanced by the inclusion of the oxazoline monomer.

The latexes are conveniently prepared by conventional emulsion polymerization techniques in an aqueous medium with conventional additives. Thus, for example, the monomer charge desired to be employed for the oxazoline modified latex is dispersed in an aqueous medium with agitation with from about 0.5 to about 5 weight percent (based on the monomer charge) of conventional anionic and/or nonionic emulsifiers (e.g., potassium, n-dodecyl sulfonate, sodium isooctobenzene sulfonate, sodium laurate, nonylphenol ethers of polyethylene glycols and the like) and thereafter polymerizing the resulting aqueous dispersion.

Conventional emulsion polymerization catalysts can be employed in the foregoing latex polymerization and common examples thereof include peroxides, persulfates, azo compounds and the like such as sodium persulfate, potassium persulfate, ammonium persulfate, hydrogen peroxide, azodiisobutyric diamide as well as catalysts (e.g., redox catalysts) which are activated in the water phase (e.g., by a water-soluble reducing agent). The type and amount of catalyst, as well as the particular polymerization conditions employed, will typically depend primarily on the other monomers which are used, and polymerization conditions will be generally selected to optimize the polymerization of such other monomers. Typically, the catalyst is employed in a catalytic amount, e.g., ranging from 0.01 to about 5 weight percent based upon the monomer weight. In general, the polymerization is conducted at a temperature in the range of from about $-10°$ to about 110° C. (preferably from about 50° to about 90° C.) Since the oxazoline group of the oxazoline monomer will hydrolyze or react with other monomers at high or low pH, the polymerization is conducted at such pH such that said hydrolysis or reaction is minimized. Typically, a pH of about 7-11, preferably about 6-11. More preferably, a pH of about 7 to about 10 is suitable. The polymerization may be conducted continuously, semi-continuously, or batch-wise.

Similarly, conventional chain transfer agents such as, for example, n-dodecyl mercaptan, bromoform, carbon tetrachloride and the like can also be employed in the normal fashion in the aforementioned polymerization to regulate the molecular weight of the polymer formed therein. Typically, when such chain transfer agents are used, they are employed in amounts ranging from 0.01 to about 10 (preferably from about 0.1 to about 5) weight percent based upon the weight of the monomers employed in the polymerization. Again, the amount of chain transfer agent employed depends somewhat on the particular chain transfer agent employed and the particular monomers being polymerized.

Suitable latex polymerization procedures are taught, for instance, in U.S. Pat. Nos. 4,325,856; 4,001,163; 3,513,121; 3,575,913; 3,634,298; 2,399,684; 2,790,735; 2,880,189; and 2,949,386.

The latex of this invention further comprises discrete particles of a coreactive polymer. Said coreactive polymer particles are prepared in an emulsion polymerization process from an addition polymerizable monomer containing pendant groups which are capable of reacting with an oxazoline group to form a covalent bond thereto (hereinafter "coreactive monomer") and at least one other monomer which is copolymerizable with said coreactive monomer.

The coreactive monomers employed herein are those which contain pendant coreactive groups which are capable of reacting with an oxazoline group to form a covalent bond thereto. It is understood that the reaction of such coreactive groups with the oxazoline group will typically, but not necessarily, cause the oxazoline ring to open.

Typically, the pendant coreactive group on the coreactive monomer will contain a reactive hydrogen atom. Exemplary coreactive groups containing an active hydrogen atom include strong and weak acid groups, aliphatic alcohols; aromatic alcohols, i.e., phenols; amines; and amides, i.e., —$CONH_2$ and —CONH— groups. In general, the more reactive of such groups, i.e., those having the more labile hydrogen, such as the acids and aromatic alcohols, are preferred herein. Such more reactive groups will generally react with the oxazoline ring more readily under milder conditions than the less reactive groups such as the amines and aliphatic alcohols. Amide groups are generally intermediate in reactivity.

Especially preferred are monomers containing pendant strong or weak acid groups or acid anhydride groups. Such monomers include those ethylenically unsaturated monomers containing acid groups, such as carboxylic acid and sulfonic acid groups, or acid anhydride groups. Sulfoethyl acrylate is an example of a suitable monomer containing a sulfonic acid group. Exemplary of suitable monomers containing carboxylic acid groups include itaconic acid, acrylic acid, methacrylic acid, fumaric acid, maleic acid, vinylbenzoic acid and isopropenylbenzoic acid. The more preferred species include acrylic, methacrylic, fumaric, itaconic and maleic acids. Maleic anhydride is an example of a suitable monomer containing an acid anhydride group.

Suitable coreactive monomers containing phenolic groups include ortho- and meta-vinyl phenol.

Suitable coreactive monomers containing aliphatic hydroxyl groups include, for example hydroxyethylacrylate, hydroxypropyl methacrylate and N-hydroxymethyl-methyl acrylamide. Derivatives of styrene having aliphatic hydroxyl groups are also useful herein.

Suitable coreactive monomers containing amide groups include acrylamide, methacrylamide, vinyl acetamide and α-chloroacrylamide. N-methylacrylamides and N-methyl-methacrylamide are examples of monomers containing —(CONH)— groups.

Suitable coreactive monomers containing amine groups include allyl amine, 2-aminoethylacrylate, 2-aminoethylmethacrylate and the like.

The other monomers suitably employed in the coreactive polymer particles are those which are copolymerizable with the coreactive monomer. In general, those monomers described hereinbefore as being useful in the preparation of the oxazoline modified polymer are also useful in the preparation of the coreactive polymer. In fact, it is often desirable to "match" the polymer backbone of the coreactive polymer to that of the oxazoline modified polymer; that is, except for the oxazoline and coreactive monomers, to employ the same monomers in the same proportions in both the coreactive and oxazoline modified polymers. It is understood, however, that different monomers may be employed in the preparation of the oxazoline and coreactive polymers in order to obtain the particular characteristics desired.

As with the oxazoline modified polymer, the coreactive polymer generally contains only a minor portion of repeating units which are derived from the coreactive monomer. In general, the coreactive monomer is employed in amounts sufficient to impart the desired autocurable properties to the latex composition and the other monomers are employed to impart the properties which are typically associated with polymers made from such monomers. In general, the coreactive monomer will comprise from about 0.1 to about 50, preferably from about 0.1 to about 20, most preferably from about 1 to about 10, weight percent of the monomers employed in the preparation of the coreactive polymer.

The coreactive polymer particles are conveniently prepared in an emulsion polymerization process similar to that described hereinbefore for the preparation of the oxazoline modified polymer. When the coreactive monomer is one containing pendant weakly acidic groups such as carboxyl groups, the polymerization is advantageously conducted under conditions sufficiently acidic to promote the copolymerization of the weekly acidic coreactive monomers with the other monomers being employed. Preferably the pH is maintained between about 1 and about 6, more preferably between 1 and about 4. Then, following the polymerization reaction, the pH of the aqueous phase is typically adjusted with base to raise the pH to about 7.5 to about 9, in order to prevent hydrolysis of the oxazoline rings in the oxazoline-modified latex upon subsequent blending.

The curable latex composition of this invention is advantageously prepared from the oxazoline modified latex and the coreactive latex by simple blending of the respective latexes in the desired proportion. In general, the relative proportions of oxazoline modified and acidic latexes are chosen such that the resulting self-curable latex composition contains from about 0.05 to about 20, preferably from 0.2 to about 5, more preferably from about 0.5 to about 2, equivalents of acid groups per equivalent of oxazoline group. In addition, better water and solvent resistance, as well as greater tensile strength is generally seen when the latex composition contains comparable amounts of particles of oxazoline-modified polymer and coreactive polymer. Preferably, the latex contains about 0.1 to 10, more preferably about 0.2 to about 5, most preferably about 0.40 to 2.5, particles of oxazoline-modified polymer per coreactive polymer particle. Such blending is advantageously performed at room temperature with mild agitation. The resulting product is an aqueous dispersion containing discrete particles of the oxazoline modified polymer and discrete particles of the acidic polymer.

Advantageously, the respective particle sizes of the ozazoline-modified and the coreactive polymers, and the respective particle size distributions are such that the particles tend to pack together well to form dense, coherent films. The particles may all be of relatively uniform size, or may have different sizes such that the packing together of said particles upon film formation is enhanced.

The curable latex composition of this invention may be used for a variety of applications including paper coating compositions, adhesives, binders and fibrous, nonwoven fabric compositions and the like. Such compositions are especially suitable for those applications in which a self-curable, curable polymer composition is desired.

The latexes of this invention may be employed as adhesives, films or binders by applying the latex to the desired substrate, then dewatering the latex and curing the dewatered polymers. The dewatering step may be performed by merely allowing the aqueous phase to evaporate under ambient conditions. Alternatively, elevated (i.e., 50°–165° C.) temperatures may be employed to dewater the latex. Curing of the polymer may, likewise, be performed at ambient temperatures. Such ambient temperature curing is an unexpected property of the latexes of this invention. Such room temperature curing is generally conducted over a period of several hours to several days depending on the particular polymers employed, the amounts of oxazoline and acidic groups in the polymer, the thickness of the film adhesive or binder layer, the amount of crosslinking desired and like factors. Curing may also be effected by heating the polymers preferably to about 105° to about 165° C., more preferably 135° to 150° C. for short periods. The foregoing drying and curing points may not be distinct steps but may be carried out simultaneously if desired.

The following examples are intended to illustrate the invention but not to limit the scope thereof. All parts and percentages are by weight unless otherwise indicated.

EXAMPLE

A. Preparation of Carboxylated Latex

Into a 1-gallon, jacketed reactor equipped with FMI lab pumps to deliver monomer and aqueous feeds are added 590 g of water, 7 g of a 1 percent active aqueous pentasodium diethylene triamine pentaacetate solution and 24.4 g of a 29 percent solids seed latex. The seed latex contains polystyrene particles having a volume average particle size of about 275 Å.

The reactor is purged with nitrogen and heated to 90° C. Then, over a 3-hour period, is added a monomer stream containing 455 g of butyl acrylate, 211 g of styrene and 28 g of acrylic acid. Beginning simultaneously with the start of the monomer stream is added continuously over a 4-hour period 245 g of deionized water, 15.56 g of a 45 percent active aqueous surfactant solution, 14 g of a 10 percent aqueous sodium hydroxide solution and 4.9 g of sodium persulfate. Following the addition of the monomer in aqueous streams, the reaction mixture is heated at 90° C. for 1 additional hour and then cooled. The product is a 44.8 percent solids latex of a butyl acrylate/styrene/acrylic acid polymer in a 65/31/4 weight ratio.

B. Preparation of Oxazoline Modified Latex

Into a 1-gallon, jacketed reactor are added 146 parts deionized water, 0.01 part of a 1 percent aqueous pentasodium diethylene triamine pentaacetate solution, 5.0 parts of Dresinate TM 214 surfactant (available commercially from Hercules, Inc.) and 0.5 part of sodium persulfate. The reactor is agitated and purged with nitrogen. To the stirred reactor is then added a mixture of 25 parts of styrene, 5 parts of 2-isopropenyl-2-oxazoline (IPO), and 0.5 part t-dodecyl mercaptan. Then, 70 parts of butadiene are added and the mixture polymerized at 60° C. for 8 hours. The reactor is then opened, and 0.5 part of sodium dimethyl dithiocarbamate are added. The latex is then steam distilled to remove any unreacted monomers. The resulting latex contains 33.5 percent solids and has polymer particles of a butadiene/styrene/IPO terpolymer in a 70/25/5 weight ratio. This oxazoline modified latex is designated as Latex No. 1 in Table I following.

Oxazoline modified Latex Nos. 2, 3 and 4 and Comparative Latex Nos. C-1 and C-2 are prepared using the general procedure employed in preparing Latex No. 1 except that the amounts of butadiene/styrene/IPO and t-dodecyl mercaptan are varied as indicated in Table I following. In those latexes containing 50 parts butadiene, no sodium dimethyl dithiocarbamate is added.

TABLE I

| Latex No. | PARTS BY WEIGHT | | | | |
|---|---|---|---|---|---|
| | Butadiene | Styrene | IPO | TDDM[1] | % Solids |
| 1 | 70 | 25 | 5 | 0.5 | 33.5 |
| C-1* | 70 | 30 | 0 | 0.5 | 36.0 |
| 2 | 70 | 25 | 5 | 1.0 | 41.7 |
| C-2* | 70 | 30 | 0 | 1.0 | 39.3 |
| 3 | 50 | 45 | 5 | 0.5 | 40.9 |
| 4 | 50 | 40 | 10 | 0.5 | 37.2 |
| C-3* | 50 | 50 | 0 | 0.5 | 38.4 |

*Not an example of this invention.
[1]T-dodecyl mercaptan

Self-curable latex compositions are prepared by stirring together at room temperature equal weights (based on solids) of IPO modified Latex No. 1 and the carboxylated latex. The IPO modified latex and the carboxylated latex are compatible at all proportions. The resulting blend is designated as Latex Composition No. 1 in Table II following. In like manner, Latex Composition Nos. 2, 3 and 4 and Comparative Latex Composition Nos. C-1, C-2 and C-3 are prepared by mixing IPO modified Latex Nos. 2, 3 and 4 and Comparative Latex Nos. C-1, C-2 and C-3 on an equal weight solids basis with the carboxylated latex. Sample No. C-4 is the carboxylated latex alone. Multiple films are prepared from Latex Composition Nos. 1 through 4 and Comparative Latex Composition Nos. C-1 through C-3 by drawing down a 20 mil thick film onto a Teflon brand coated steel plate and then drying the film at ambient temperatures until it becomes transparent. The transparent films are then peeled from the plate and further dried at ambient temperature for about 24 hours. Some of the resulting films were then cured for 5 minutes at 80° C., 120° C. or 150° C. The resulting films are then cut into 0.5 inch wide strips and tested on an Instron tensile tester for elongation at break and tensile strength. In addition, duplicate samples are soaked for 5 minutes in a 0.5 percent aqueous surfactant solution and the thus wetted films are tested on the Instron for elongation at break and tensile strength. The results are as recorded in Table II following.

TABLE II

| | Latex Composition Numbers | | | | | | | |
|---|---|---|---|---|---|---|---|---|
| | 1 | C-1* | 2 | C-2* | 3 | 4 | C-3* | C-4* |
| R.T. Cure[1] | | | | | | | | |
| Dry Elong.[2] | 1333 | 1277 | 1329 | 1112 | 702 | 605 | 1407 | 975 |
| Wet Elong.[3] | 1467 | 1700 | 1527 | 1700 | 971 | 799 | 1800 | 1183 |
| Dry Tensile[4] | 216 | 118 | 180 | 82 | 236 | 251 | 171 | 619 |
| Wet Tensile[5] | 118 | 46 | 104 | 35 | 341 | 367 | 91 | 277 |
| 80° C. Cure[6] | | | | | | | | |
| Dry Elong. | 1065 | 1153 | 1067 | 976 | 676 | 613 | 1159 | N.D. |
| Wet Elong. | 999 | 1362 | 963 | 1208 | 683 | 641 | 1157 | N.D. |
| Dry Tensile | 466 | 189 | 426 | 142 | 557 | 681 | 376 | N.D. |
| Wet Tensile | 307 | 102 | 265 | 96 | 516 | 660 | 267 | N.D. |
| 120° C. Cure[7] | | | | | | | | |
| Dry Elong. | 701 | 1104 | 786 | 902 | 589 | 480 | 1063 | 916 |
| Wet Elong. | 705 | 1700 | 869 | 1233 | 609 | 442 | 1340 | 1397 |
| Dry Tensile | 573 | 268 | 525 | 186 | 810 | 830 | 493 | 391 |
| Wet Tensile | 403 | 125 | 432 | 81 | 706 | 700 | 381 | 264 |

TABLE II-continued

| | Latex Composition Numbers | | | | | | | |
|---|---|---|---|---|---|---|---|---|
| | 1 | C-1* | 2 | C-2* | 3 | 4 | C-3* | C-4* |
| 150° C. Cure[8] | | | | | | | | |
| Dry Elong. | 619 | 1240 | 655 | 1091 | 514 | 373 | 1039 | 885 |
| Wet Elong. | 674 | 1800 | 639 | 1800 | 508 | 397 | 1471 | 1082 |
| Dry Tensile | 518 | 235 | 498 | 151 | 781 | 943 | 347 | 276 |
| Wet Tensile | 506 | 67 | 344 | 44 | 581 | 892 | 306 | 135 |

*Not an example of the invention.
N.D. is not determined.
[1]Cured at room temperature for 24 hours.
[2]Percent elongation of dry (nonwet) films as tested using an Instron tester.
[3]Percent elongation of films soaked for 5 minutes in a 0.5 percent aqueous surfactant solution prior to testing. Testing performed on an Instron tester.
[4]Tensile strength of dry (nonwet) films evaluated on an Instron tester.
[5]Tensile strength of films soaked for 5 minutes in 0.5 percent aqueous surfactant solution prior to testing on an Instron tester.
[6]Films cured at 80° C. for 5 minutes prior to testing.
[7]Films cured at 120° C. for 5 minutes prior to testing.
[8]Films cured at 150° C. for 5 minutes prior to testing.

As can be seen from Table II, the latex compositions of this invention generally form films having higher tensile strength and somewhat lower elongation than the comparative latex compositions. The data presented in Table II clearly illustrates the improved resistance to water exhibited by the latex compositions of this invention. Films prepared from the comparative latex compositions exhibit decreases in the range from about 30 to 70 percent in tensile strength upon wetting. By contrast, the latex compositions of this invention typically lose only about 10 to 25 percent of their tensile strength. Thus, the films prepared from the latex composition of this invention are clearly significantly less water sensitive than the films prepared from the comparative latex compositions. In addition, the films prepared from the latex compositions of this invention exhibit an excellent combination of good elongation and high tensile strength both in the dry and wet samples.

In order to measure degree of crosslinking and resistance to solvents, the swelling index and percent gel of the above-prepared films which have been cured at room temperature, 100°, 120° and 150° C. are determined as follows.

Duplicate film samples are prepared from Latex Composition Nos. 1 and C-1, using a 0.020 inch casting bar. Each film is allowed to dry until clear and is peeled off as a continuous film. One film is evaluated without curing; others are evaluated after 5 minute cures at 100°, 120° and 150° C., respectively. The film being tested is weighed and placed into a centrifuge tube. To the tube is added 30 g of toluene. The tube is sealed and shaken vigorously for 90 minutes. The tube is then centrifuged at about 18,000–19,200 rpm for 1 hour. The toluene is then poured off and the remaining wet gel is weighed. The gel is then dried in a vacuum oven until a constant weight is obtained. Percent gel is calculated as:

$$\frac{\text{weight of dry gel} \times 100\%}{\text{weight of film sample}}.$$

Swelling index is calculated as:

$$\frac{\text{weight wet gel} - \text{weight dry gel}}{\text{weight dry gel}}.$$

The results obtained are as reported in Table III following.

TABLE III

| | Latex Composition No. 1 | Latex Composition No. C-1* |
|---|---|---|
| Swelling Index | | |
| R.T. Cure | 13.86 | 23.3 |
| 100° C. Cure | 7.58 | 22.62 |
| 120° C. Cure | 8.23 | 27.41 |
| 150° C. Cure | 7.02 | 23.88 |
| % Gel | | |
| R.T. Cure | 81.3 | 42.03 |
| 100° C. Cure | 81.65 | 49.83 |
| 120° C. Cure | 80.87 | 46.38 |
| 150° C. Cure | 82.99 | 49.66 |

*Not an example of the invention.

As can be seen in Table III, films prepared from the latexes of this invention exhibit greatly increased resistance to solvents and greater proportions of insoluble material than do the comparative samples. Testing of films prepared from Latex Composition Nos. 2, 3 and 4 show similarly improved solvent resistance and higher amounts of insoluble material as compared to the relevant controls.

What is claimed is:

1. A curable latex composition comprising an aqueous dispersion of (a) discrete particles of an oxazoline modified addition polymer containing pendant oxazoline groups, which polymer has been prepared in an emulsion polymerization process from (1) an oxazoline as represented by the formula:

$$R^2-\underset{\underset{O}{|}}{\overset{\overset{R^2}{|}}{C}}-\left(\underset{\underset{N}{|}}{\overset{\overset{R^2}{|}}{C}}\overset{R^2}{\diagup}\right)_n$$
$$\diagdown C \diagup$$
$$|$$
$$R^1$$

wherein $R^1$ is an acyclic organic radical having addition polymerizable unsaturation; each $R^2$ is independently hydrogen, halogen or an organic radical and n is 1 or 2 and (2) at least one other addition polymerizable monomer which is copolymerizable with said oxazoline and is not a coreactive monomer or an oxazoline and (b) discrete particles of a coreactive polymer containing pendant coreactive groups selected from the group consisting of strong and weak acid groups, aliphatic alcohols, aromatic alcohols, amines and amides which coreactive polymer has been prepared in an emulsion polymerization process from (1) an addition polymerizable coreactive monomer containing pendant groups which are capable of reacting with an oxazoline group to form a covalent bond thereto and (2) at least one other monomer which is not a coreactive monomer or an oxaoline which is copolymerizable with said addition monomer.

2. The latex of claim 1 wherein the coreactive polymer particles contain from about 0.5 to about 2 equivalents of coreactive groups per equivalent of oxazoline group contained in the oxazoline modified polymer particles.

3. The latex of claim 1 wherein the coreactive monomer contains pendant strong or weak acid groups.

4. The latex of claims 3 wherein the coreactive monomer is an addition polymerizable carboxylic acid.

5. The latex of claim 1 wherein $R^1$ is as represented by the structure:

wherein R³ is an alkyl group.

6. The latex of claim 5 wherein the oxazoline is 2-isopropenyl-2-oxazoline.

7. The latex composition of claim 1 wherein the oxazoline-modified polymer is a polymer of styrene, butadiene and 2-isopropenyl-2-oxazoline.

8. The latex composition of claim 7 wherein the coreactive polymer is a polymer of butyl acrylate, styrene and acrylic acid.

9. A film formed from the latex composition of claim 1.

* * * * *

UNITED STATES PATENT AND TRADEMARK OFFICE
CERTIFICATE OF CORRECTION

PATENT NO. : 4,474,923

DATED : October 2, 1984

INVENTOR(S) : William H. Keskey et al.

It is certified that error appears in the above—identified patent and that said Letters Patent is hereby corrected as shown below:

Col. 5, line 41, "for example" should read --for example,--; bridging lines 42 and 43, "N-hydroxymethyl--methyl" should read --N-hydroxymethyl-N-methyl--.
      Col. 6, line 53, "ozazoline-modified" should read --oxazoline-modified--.
      Col. 9, line 15, after "5 minutes in", please insert --a--.
      Claim 1, line 38, that portion of the formula which reads " 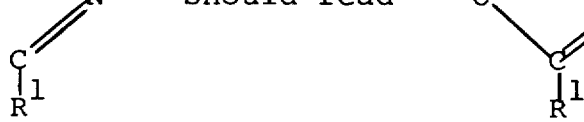 " should read -- ... -- ;

Claim 1, line 55, "oxaoline" should read --oxazoline--.
      Claim 4, line 1, "claims" should read --claim--.

Signed and Sealed this

Twenty-fourth Day of September 1985

[SEAL]

Attest:

DONALD J. QUIGG

Attesting Officer

Commissioner of Patents and Trademarks—Designate